United States Patent [19]

Leiber

[11] Patent Number: 4,484,784
[45] Date of Patent: Nov. 27, 1984

[54] DUAL-CIRCUIT BRAKE APPARATUS

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 410,799

[22] Filed: Aug. 23, 1982

[30] Foreign Application Priority Data

Sep. 18, 1981 [DE] Fed. Rep. of Germany ....... 3137200

[51] Int. Cl.³ ............................................. B60T 17/18
[52] U.S. Cl. .................................................... 303/92
[58] Field of Search ...................... 303/2, 20, 52, 84 A, 303/84 R, 92, 95, 96, 103, 111, 116

[56] References Cited

U.S. PATENT DOCUMENTS

| | | | |
|---|---|---|---|
| 3,948,568 | 4/1976 | Leiber | 303/92 |
| 3,963,276 | 6/1976 | Atkins | 303/92 |
| 3,980,987 | 9/1976 | Ishigami et al. | 303/84 A X |
| 3,982,792 | 9/1976 | Nakajima | 303/84 A X |
| 3,995,912 | 12/1976 | McNinch et al. | 303/92 |

Primary Examiner—Duane A. Reger
Attorney, Agent, or Firm—Edwin E. Greigg

[57] ABSTRACT

A dual-circuit brake system which is combined with an anti-wheel-lock apparatus, also known as an anti-skid braking system. Between the two brake circuits I and II, in the vicinity of the anti-skid magnetic valves, a pressure sensor is provided which responds when there are unequal pressures in the two brake circuits I and II and with the aid of pre-programmed test cycles in an electronic control unit of the anti-skid braking system enables the monitoring of the functioning of the magnetic valves. The apparatus is preferably usable in passenger vehicles in the higher price ranges.

9 Claims, 5 Drawing Figures

DUAL-CIRCUIT BRAKE APPARATUS

BACKGROUND OF THE INVENTION

The invention is based on a dual-circuit brake system having a pressure sensor for monitoring the brake pressures occurring at various times in the two brake circuits, the pressure sensor being equipped with a double piston which is subjected to the pressure of the two brake pressures and with an electrical switch disposed between the two pistons of the double piston and actuated via oblique faces and a push rod. A brake system of this kind is known (U.S. Pat. No. 4,030,785). The Leiber U.S. Pat. No. 4,141,595 is also considered to be of interest relative to its electronic control unit.

In this known dual-circuit brake system, the pressure sensor provides that if one brake circuit fails, a switch will close an electrical circuit so that the driver will learn of the defect by way of an optical and/or acoustical signal. The known design provides no impetus to make a combination with other, preferably electronic, control units for the purpose of further evaluation of the switching signals.

A further factor is that modern anti-wheel-locking systems, also known as anti-skid braking systems, which are primarily designed using integrated circuitry, include a test circuit which monitors the electronic function and the electrical connection of the components, for instance at the beginning of a drive. According to the present state of the art, the hydraulic functions of such a system are not monitored. In principle, this would be possible by means of the installation of a specialized pressure sensor in each individual regulating conduit; however, because of the expense (pressure sensors and electrical lines leading to the control unit), this is not done. So-called "diagnosis contacts" have also been provided on a magnetic valve actuated by the magnetic armature. However, the expense for such a provision is again not insignificant. Furthermore, in the latter case only part of the control member, namely the armature movement, is monitored, which does not necessarily mean, however, that the hydraulic valve actuated by the armature is also functioning correctly.

OBJECT AND SUMMARY OF THE INVENTION

The dual-circuit brake system revealed herein has the advantage over the prior art that a single, central pressure sensor automatically monitors the courses of a plurality of functions. Another embodiment of the invention offers the further advantages that a diagnosis of a plurality of functional data such as switching times and pressure gradients of the anti-skid braking apparatus can be monitored. The pressure transducer signals of the anti-skid braking apparatus can also be evaluated for the operation of the anti-skid system, for instance, in order to recognize low coefficients of adhesion by way of a low pressure level or for influencing the clock times of the anti-skid magnetic valves.

A further advantage is that the pressure in the brake lines can be evaluated for the purpose of testing the road surface ($\mu$ test) or for testing when the vehicle is at a stop.

Finally, it is advantageous that upon the occurrence of a pressure difference between the two brake circuits, a magnetic valve can be triggered in order to prevent the failure of the pressure supply if such a defect occurs.

The invention will be better understood and further objects and advantages thereof will become more apparent from the ensuing detailed description of a preferred embodiment taken in conjunction with the drawings.

DESCRIPTION OF THE EXEMPLARY EMBODIMENT

Figure 1:
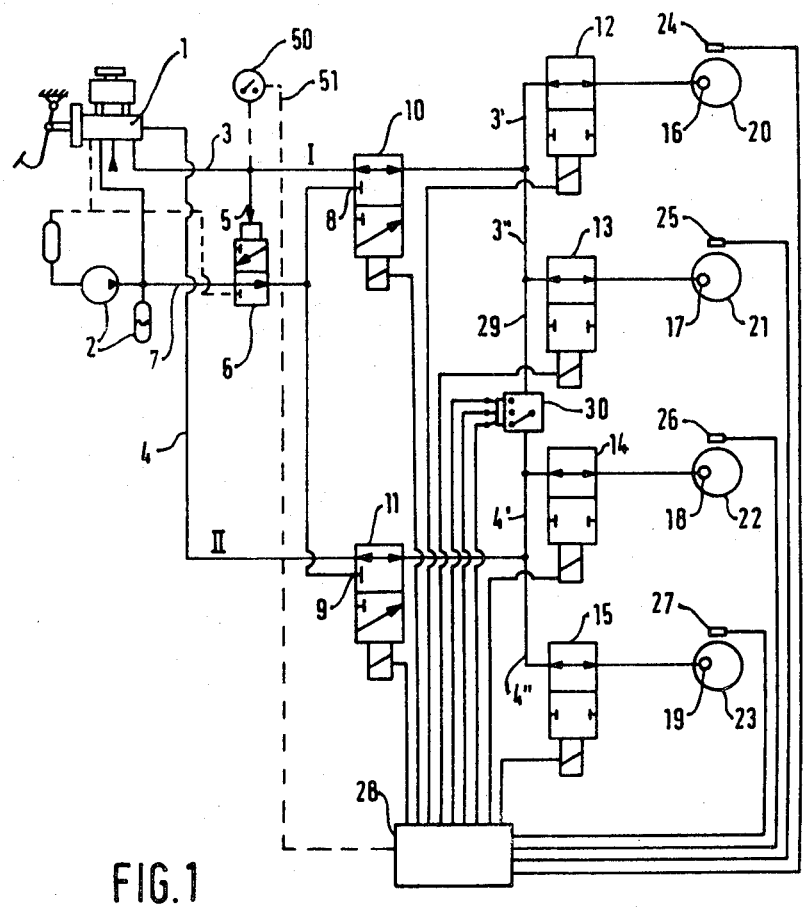
FIG. 1 shows schematically a dual-circuit brake system combined with an anti-skid braking apparatus, the brake system being equipped with the pressure sensor.

A dual-circuit brake system has a dual-circuit brake amplifier 1, with which a pressure generating device 2 is associated. Two brake lines 3, 4 depart from the brake amplifier 1, one brake line being associated with one brake circuit I and the other brake line being associated with a brake circuit II. A line 5 branches off from the brake line 3 and leads to a 3/2-way switching valve 6 actuated by brake pressure. This switching valve 6 monitors a line connection 7, which leads from the pressure generating device 2 to terminals 8 and 9 of each 3/2-way magnetic valve 10 and 11, respectively. Both magnetic valves 10 and 11 generally are in the pass-through position for the brake line 3 and 4; in their second position, attainable under the influence of magnetic force, they close off their connection with the brake amplifier 1 and switch the pressure generating device 2 to a portion of the brake line 3 and 4 located behind the respective magnetic valves 9 and 10. This portion of the brake line is made up of line branches 3' and 3''; and 4' and 4'', respectively, leading via one 2/2-way magnetic valve 12, 13, 14, 15 each to wheel brake cylinders 16, 17, 18, 19. The wheel brake cylinders 16, 17, 18, 19 are disposed on vehicle wheels 20, 21, 21, 23, whose rotation is monitored by sensors 24, 25, 26, 27. The sensors 24–27 are connected to an electronic control unit 28, to which a line also leads from each magnetic valve 10, 11, 12, 13, 14, 15.

Between the two 3/2-way magnetic valves 10 and 11 on the one hand and the four 2/2-way magnetic valves 12, 13, 14, 15 on the other, there is a line connection 29 into which a pressure sensor 30 has been inserted.

Figure 1A:
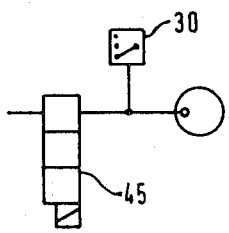
FIGS. 1a and 1b show modifications of the magnetic valve apparatus of FIG. 1.
Figure 1B:
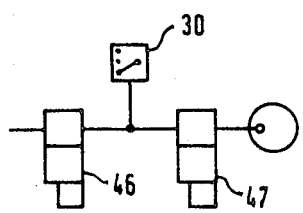

FIGS. 1a and 1b show that it is also possible, instead of a 2/2-way magnetic valve 14 or 15, to use a 3/3-way magnetic valve 45 instead and to dispose the pressure sensor 30 on the wheel side or to provide two 2/2-way magnetic valves 46 and 47, switched in sequence one behind the other, and to dispose the pressure sensor 30 between them.

Figure 2:
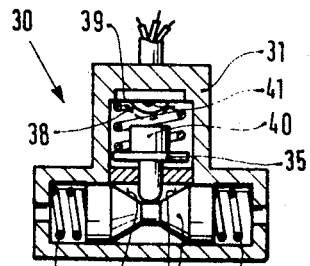
FIG. 2 shows the pressure sensor in section.

The pressure sensor 30 is capable of assuming three switching positions, shown in the form of points in FIG. 1. These points are switching contacts of a multi-stage switch 31. The sectional view of FIG. 2 shows that the pressure sensor 30 has a double piston 32, one end of which is at the pressure of brake circuit I and the other end of which is at the pessure of brake circuit II. Two springs 33 and 34 provide that the double piston 32 will generally assume a central position. In this central position, a spring-loaded switch push rod 35 is located in its lowermost position, in which no contact connection exists. At the left and right of the push rod 35, the double piston 32 has two oblique faces 36 and 37, which the push rod 35 can run up against. The push rod 35 can then assume two positions one after the other, in which it closes contacts 38 and 39. Disposed in the multi-stage switch 31 are a permanent magnet 40 on the one hand and, on the other hand, a linear Hall transducer 41 as an electronic switching member.

If a differential pressure is exerted upon the double piston 32, the piston is deflected accordingly. The switch 31 then furnishes a signal hich is proportional to the differential pressure.

Upon the actuation of the brake amplifier 1, the switching valve is moved into its other switching position by the increasing brake pressure. As a result, the two 3/2-way magnetic valves 10 and 11 are connected to the relief side of the pressure generating device 2. If no brake pressure is generated by the brake amplifier 1, then the reservoir pressure of the pressure-generating device 2 prevails at the two 3/2-way magnetic valves 10 and 11. By this manner of sequencing and by exciting the 3/2-way magnetic valves 10 and 11, the pressure of the pressure generating device 2 can be fed directly into the brake circuits I or II. However, this manner of sequencing is not the subject of the invention.

The two 3/2-way magnetic valves 10 and 11 and the four 2/2-way magnetic valves 12, 13, 14, 15 are switching elements of the anit-skid braking apparatus, which in accordance with the signals 24, 25, 26, 27 keep the brake lines 3 and 4 open or close them and also either reduce, maintain, or once again increase the pressure in the brake cylinders 16, 17, 18, 19.

Figure 3:
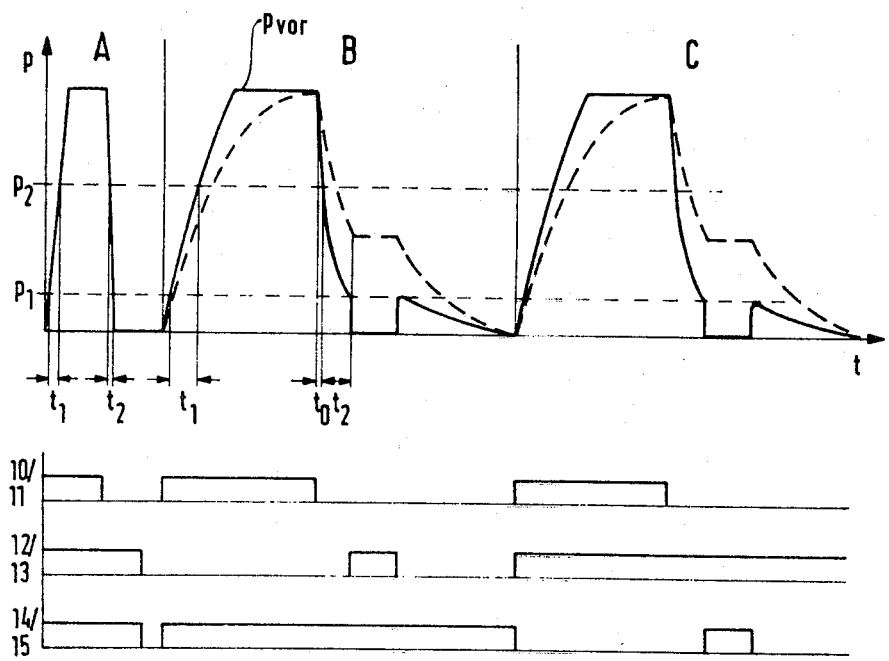
FIG. 3 is a diagrammatic view showing the course of various pressures over time.

The course over time of various pressures which act upon the pressure sensor 30 and the associated switching signals of the magnetic valves 10, 11, 12, 13, 14, 15 are shown in the diagram given in FIG. 3. The switching times of the three groups of magnetic valves 10/11, 12/13, 14/15 are shown below the pressure courses.

It can be seen that the functioning of the 3/2-way magnetic valve 10 or 11 is monitored in a test cycle A pre-programmed in the electronic control unit 28. The electronic control unit includes a digital signal preparation means for obtaining signals relating to acceleration of the wheel circumferences and to wheel slippage, a logic means for linking the wheel circumference acceleration and slippage signals and for triggering the final output stages of the magnetic valves in the event that a tendency to wheel locking is ascertained and a safety circuit for monitoring the anti-skid system, which recognizes critical errors in the anti-skid system and in the event of an error shuts off the anti-skid system and warns of this with a warning light. Within two time periods $t_1$ and $t_2$, the pressure must be both built up and then reduced once again. To this end, a test cycle takes its course in the safety circuit of the electronic control unit; that is, at time $t=0$, the 3/2-way magnetic valves are excited, so that the pressure behiind these valves increases. As soon as the pressure $p_1$ has been attained, a counter in the safety circuit begins to operate, its counter state increasing linearly with the time. Within the period $t_1$, measured by the counter, the pressure $p_1$ must be attained. The valves 10, 11 are then de-energized once again, and the same counter is reset back to zero. The pressures behind the valves now drop once again. As soon as they attain the pressure $p_2$, the counter begins once again to count in a linear relationship with the time. Within the time period $t_2$, the pressure must have fallen below $p_1$; in that event, the valves 10 and 11 are functioning correctly.

The pressure gradients of the course of pressure here are quite steep, because the 2/2-way magnetic valves 12, 13 or 14, 15 are closed, and as a result virtually no increase in volume of the brake circuits I and II is possible. If there is a malfunction in the 2/2-way magnetic valves 12, 13 or 14, 15, that is, if these valves do not close, then the pressure gradient changes; this effect on the pressure gradient is evaluatable in the electronic control unit 28, on the same principle as was described earlier for the test cycle A.

In the test cycle B, the 2/2-way magnetic valve 12 or 13 is tested. The 2/2-way magnetic valves 14 and 15 are closed. The pressure gradient is monitored here by evaluating the time $t_1$ between the pressure levels $p_1$ and $p_2$. At the beginning of the pressure reduction, the time $t_o$ is measured by comparison of the electronic trigger signal with the pressure variation then beginning. The pressure gradient is measured, in turn, via the time $t_2$ within the two pressure levels $p_1$ and $p_2$. Subsequently, monitoring of the closing function of the 2/2-way magnetic valves 12, 13 is performed. After the magnetic valves 12, 13 have been switched back to "open", if the valves are intact, the pressure must attain the pressure level $p_1$ sooner.

The test of the 2/2-way magnetic valves 12/13 is thereupon completed. The monitoring of the 2/2-way magnetic valves 14/15 is then performed in the same manner.

The pre-programmed test cycles A, B and C may be integrated into a safety circuit, known per se, of the anti-skid apparatus. An integration of this kind is advantageously made within the electronic control unit 28.

A diagnosis circuit for the commencement of vehicle operation when the ignition has been switched on and the vehicle velocity is 0 can also be provided in the electronic control unit.

For all these pressure measurements, the pressure sensor 30 provides the appropriate signals. The measured pressure level may also be evaluated in order to test road adhesion. With the aid of the pressure sensor 30, if there is a failure of one brake circuit the corresponding 2/2-way magnetic valves 12, 13, 14, 15 are again triggerable, in cooperation with the electronic control unit 28, in order to block off the defective brake circuit.

It can be seen that the pressure sensor 30, in cooperation with test cycles pre-programmed in the electronic control unit 28, represents a complete and simple monitoring apparatus for the correct functioning of both the magnetic valves 10-15 and the anti-skid system as well.

As indicated by dashed lines in FIG. 1, it is also possible to dispose a pressure switch 50 in the brake line 3, and to connect this switch 50 via an electrical line 51 to the electronic control unit 28. In combination with the wheel sensors 24, 25, 26 and 27, it is then possible to run a test program with the vehicle at a standstill. The switch is closed upon the actuation of the brake, and the test program then runs its course via the electronic control unit 28 while the vehicle is at a standstill.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A dual-circuit brake system having a three-position pressure sensor in said system for monitoring dual brake pressures which occur at various times in said dual brake circuits, said pressure sensor being equipped with a double piston formed with oppositely disposed axially aligned oblique faces which is subjected to the pressure of said dual brake pressures and with an electrical switch disposed between and actuated via said oblique faces of said double piston, characterized in that said dual-circuit brake system is combined with an anti-skid braking apparatus equipped with magnetic valves and that said pressure sensor is disposed in said brake circuits between said magnetic valves of the anti-skid braking apparatus and wheel-cylinders of said braking system, said anti-skid braking apparatus further including an electronic control unit, said electronic control unit is provided with an evaluation circuit for signals of said pressure sensor as well as at least one pre-programmed test cycle for the purpose of automatically running a test.

2. A dual-circuit brake system as defined by claim 1, characterized in that said pressure sensor further includes a multi-stage switch.

3. A dual-circuit brake system as defined by claim 2, characterized in that said multi-stage switch further includes a permanent magnet and an electronic switching member, said switching member preferably comprising a linear Hall transducer.

4. A dual-circuit braking system as defined by claim 3, characterized in that said pre-programmed test cycle (A, B, C) is integrated into a safety circuit of the anti-skid braking apparatus.

5. A dual-circuit brake system as defined by claim 3, characterized in that said electronic control unit further includes a diagnosis circuit for the beginning of a drive, when the ignition is turned on and velocity of a vehicle is zero.

6. A dual-circuit brake system as defined by claim 3, characterized in that said electronic control unit further includes an evaluation circuit for the pressure level occurring during the operation of said anti-skid braking apparatus.

7. A dual-circuit brake system as defined by claim 5, characterized in that said pressure level is evaluatable for the purpose of testing road adhesion.

8. A dual-circuit brake system as defined by claim 3, characterized in that said pressure sensor is arranged to sense a circuit failure and when circuit failure is sensed said magnetic valves are triggerable in cooperation with said electronic control unit in order to block off the defective brake circuit (I or II).

9. A dual-circuit brake system as defined by claim 1, said anti-skid braking apparatus further including an electronic control unit characterized in that said electronic control unit further includes another pressure switch arranged to be actuated in accordance with brake pressure whereby the brakes of a vehicle can be tested while the vehicle is at a standstill position.

* * * * *